Oct. 13, 1925.                                       1,557,209
                         J. W. LEE
                       ROTARY CUTTER
                    Filed Feb. 25, 1924        3 Sheets-Sheet 1
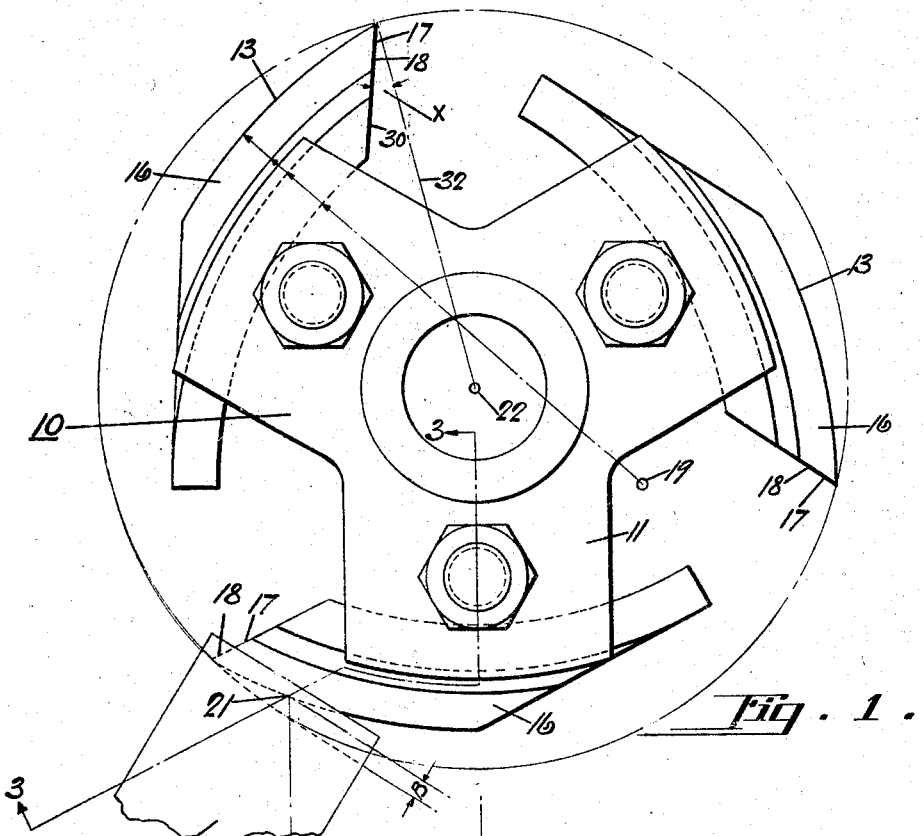
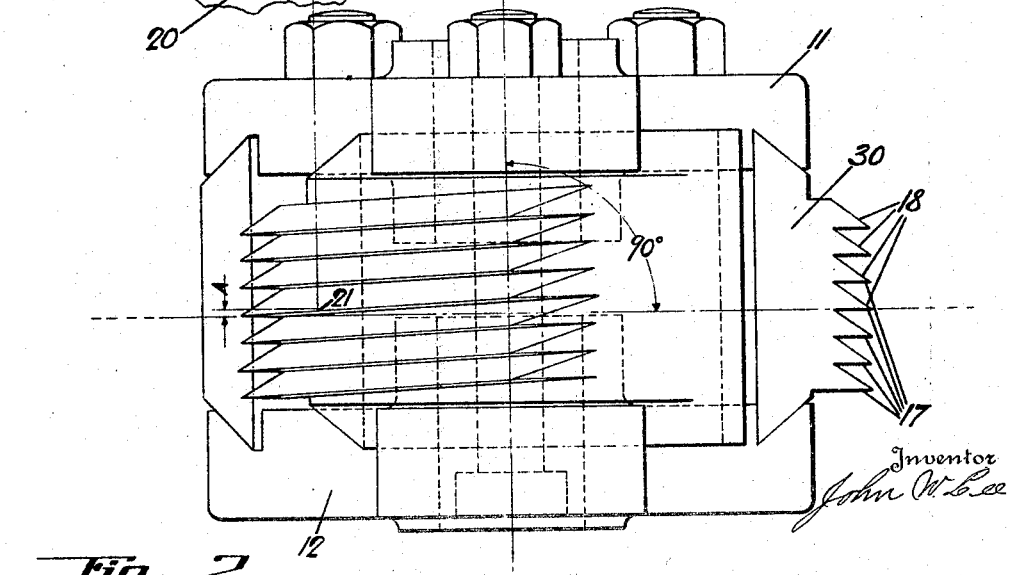

Oct. 13, 1925.

J. W. LEE

ROTARY CUTTER

Filed Feb. 25, 1924  3 Sheets-Sheet 2

Inventor
John W. Lee

By Spencer, Sewall & Hardman
his Attorney

Oct. 13, 1925.

J. W. LEE

ROTARY CUTTER

Filed Feb. 25, 1924

Patented Oct. 13, 1925.

1,557,209

UNITED STATES PATENT OFFICE.

JOHN W. LEE, OF DAYTON, OHIO, ASSIGNOR TO INLAND MANUFACTURING COMPANY, OF DAYTON, OHIO, A CORPORATION OF DELAWARE.

ROTARY CUTTER.

Application filed February 25, 1924. Serial No. 694,815.

*To all whom it may concern:*

Be it known that I, JOHN W. LEE, a citizen of the United States of America, residing at Dayton, county of Montgomery, and State of Ohio, have invented certain new and useful Improvements in Rotary Cutters, of which the following is a full, clear, and exact description.

This invention relates to rotary form cutters for cutting either metal or wood but has special reference to such cutters for cutting grooves in wood for making scarf and similar joints.

An object of this invention is to provide a form cutter which is cheap to manufacture, more rugged and lasting and which makes a cleaner and better cut than present cutters.

A more specific object is to provide a form cutter having at least one cutting edge making a radial cut and whose cutting faces are backed off from the work cut by the cutting edges thereof and yet one which may be reground a large number of times without changing the form of the cut made thereby.

Another object is to provide such a cutter having at least one cutting edge which makes a radial cut or substantially radial cut in the work and yet one whose cutting teeth are well backed up with metal to give strength, rigidity and wearing qualities thereto.

Another object is the method of manufacture of multiple blade cutters comprising cutting a plurality of cutter blades about a common axis and then rearranging the blades to their proper positions relative to one another, whereby the cost of manufacture is reduced.

Further objects and advantages of the present invention will be apparent from the following description, reference being had to the accompanying drawings, wherein a preferred form of embodiment of the present invention is clearly shown.

In the drawings:

Fig. 1 is a side elevation of a rotary cutter built according to this invention for cutting scarf joint cuts in pieces of wood as shown.

Fig. 2 is a bottom view looking up at Fig. 1.

Figures 3, 9:
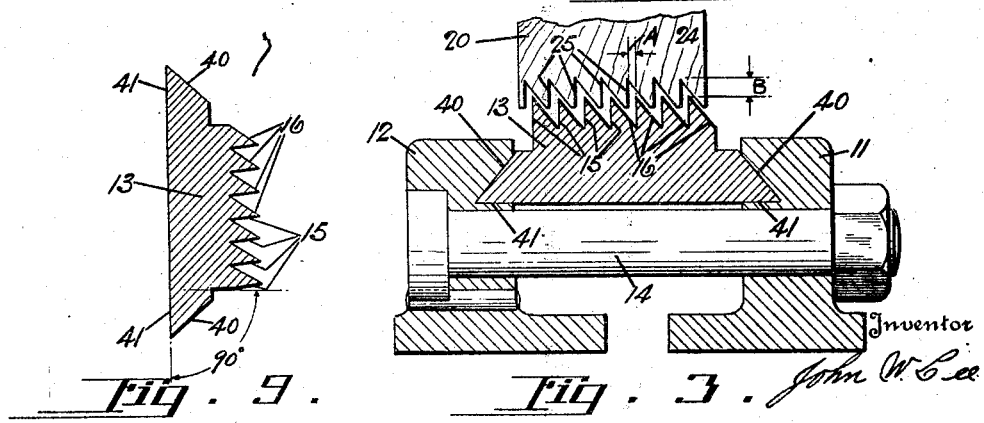
Fig. 3 is a section through the cutting faces parallel to the cutting edges thereof and is taken on line 3—3 of Fig. 1 showing how the cutting faces are backed off from the cuts in the work made by the cutting edges on said cutting faces.
Fig. 9 is a section along line 9—9 of Fig. 8.

In the drawings, 10 designates the cutter head in its entirety which is composed of two side plates 11 and 12 between which are clamped the separate cutter blades 13, all the parts being rigidly held together by means of the bolts 14 (see Fig. 3). The cutter blades 13 are each provided with arc-shaped helical cutting surfaces 15 and 16, the center of curvature 19 of which is preferably located beyond the cutter head axis thus giving a greater radius of curvature to the cutting surfaces than the radius of the arc of rotation of said surfaces and at the same time causing said cutting surfaces 15 and 16 to recede radially away from the cuts made by their respective leading edges 17 and 18, which leading edges will hereinafter be termed the "cutting edges" 17 and 18 (see Figs. 1 and 2). In the Fig. 1 a piece of work 20 is being grooved by the cutting edges 17 and 18 as said work passes in a tangential direction to the rotating cutter 10.

It will be clear from Figs. 1 and 3 that at the point 21 the cutting surfaces 15 and 16 have moved from the cuts in the work 20 toward the cutter axis 22 a radial distance "B", which movement obviously causes the slanting cutting surface 16 to be backed off from the cut 24 in the work. But since the cutting edges 17 are radial this radial movement alone will not cause the almost radial surfaces 15 to be backed off from the cuts 25 in the work to give good clearance and hence the cutting surfaces 15 and 16 are made in the form of a helix having a slight pitch along the axis 22. At the point 21 this helical pitch has caused the surface 15 to be backed off from the radial cut 25 in the work 20 an axial distance "A" (see Figs. 3 and 2). Of course this helical pitch reduces the clearance between the cutting surfaces 16 and the cuts 24 and hence preferably such a helical pitch is chosen that the amount of clearance will be substantially the same for both the cutting surfaces 15 and 16.

It will be clear that the leading edges of the blades 13 may be ground off for resharpening purposes as often as desired without changing the form of the cut in work 20 as long as the leading surface 30 of the entire blade is ground back at such an angle as to maintain a constant angle X between the plane of the leading surface 30 and the radial line 32. The cutter blades 13 must be set forward after each regrinding by loosening the bolts 14 in order to maintain the outer diameter of the cutting edges constant.

Figure 4:
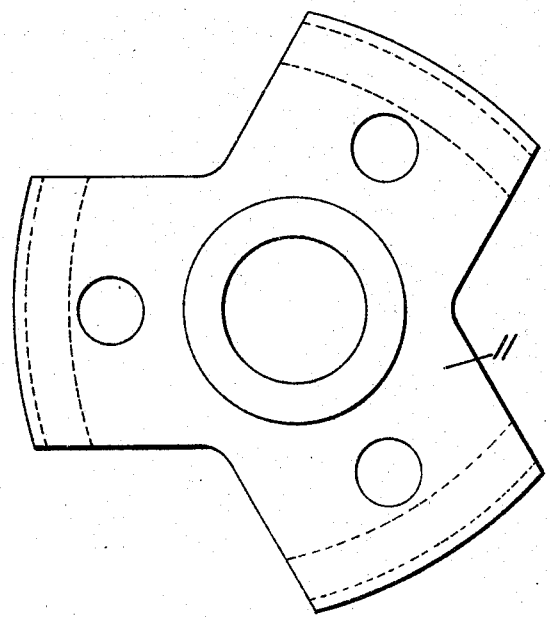
Figs. 4 and 5 are two detail elevational views of one side plate of the cutter head.
Figure 5:
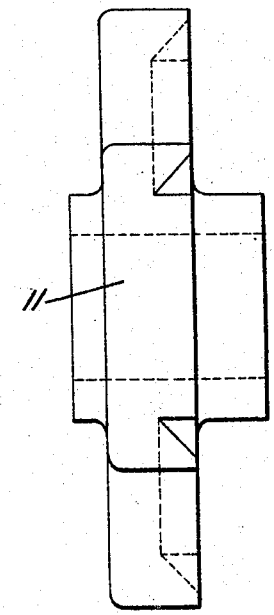
Figure 6:
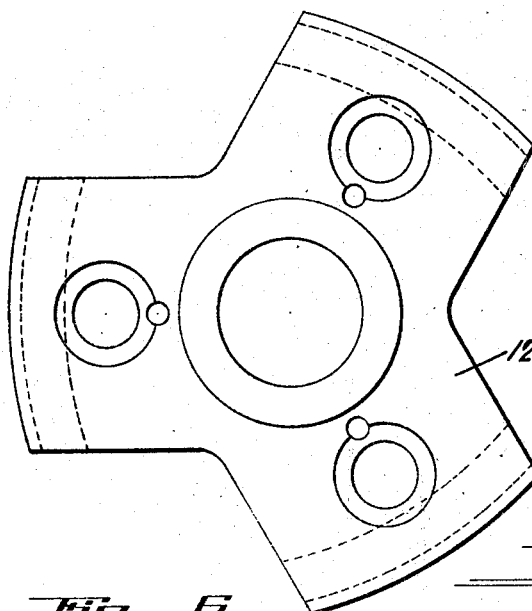
Figs. 6 and 7 are two similar views of the other side plate of the cutter head.
Figure 7:
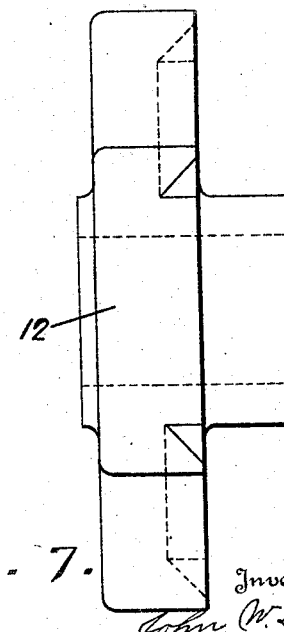
Figure 8:
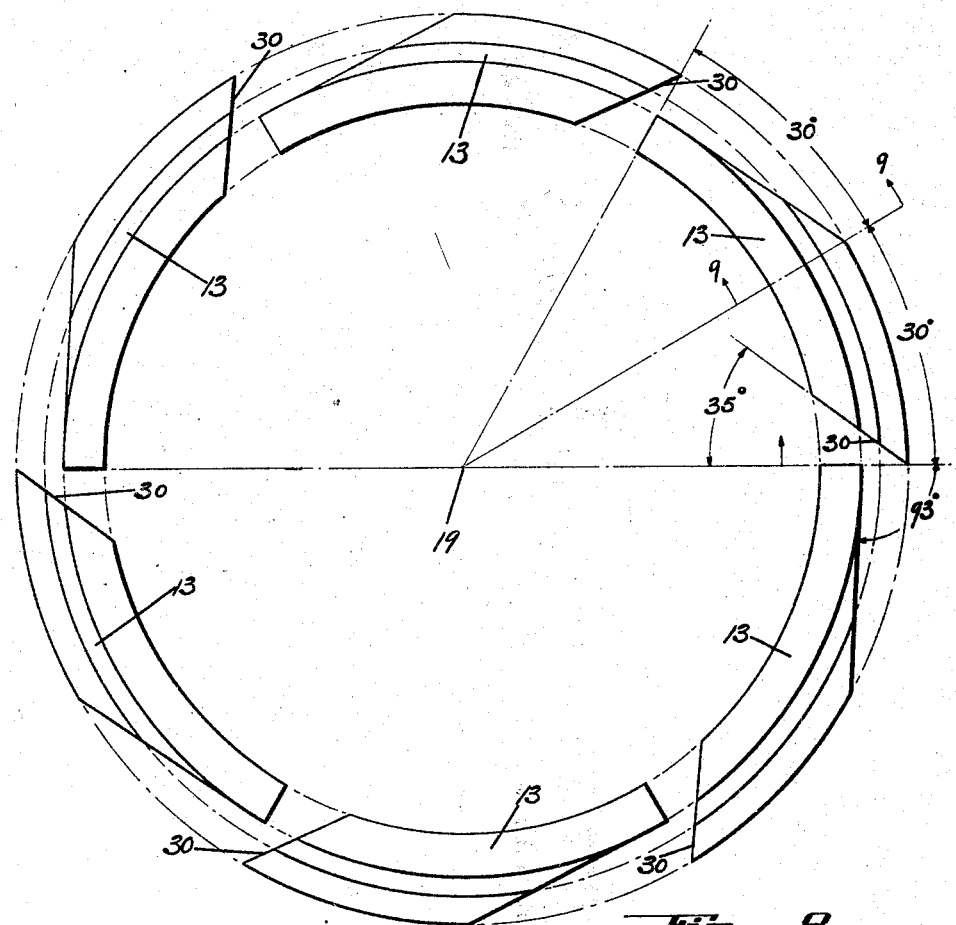
Fig. 8 is a diagrammatic view illustrating the method of cutting a plurality of cutter blades by turning them about a common center.

An important feature of this invention is the method of manufacture to which the form of the blades 13 lend themselves. Since all the cutting faces as well as the guiding surfaces 40 and 41 of the blades 13 are turned about a common axis 19, these blades 13 may first be machined from an integral ring of stock, as illustrated in Figs. 8 and 9, and then cut apart. Fig. 8 illustrates the forming of six blades 13 from a single piece of stock, the pitch of the cutting surfaces 15 and 16 of all the blades being the same and hence they can all be cut in a manner similar to cutting screw threads in a lathe. The pitch is such that it advances a full tooth every 120° and hence three alternate blades 13 may be set up in the cutter head 10 at a time, which will cause the cutting edges 17 and 18 of the seven teeth of each of the three blades to track immediately behind one another as the cutter 10 is rotated upon its axis. It is thus clear that all six blades 13 may have all their arcuate surfaces machined to finished dimensions before the separate blades are cut apart. Also if it is desired to grind the guide surfaces 40 and 41 after the blades are hardened, the blades 13 may be nearly cut apart but still be held rigidly together by the connecting necks of metal, the set of blades being then hardened and ground to exact dimensions while in integral form, and finally the blades being broken apart at the narrow connecting necks.

It is obvious that instead of machining the blades 13 from an integral piece of stock a plurality of separate pieces of stock may be held rigidly together in a suitable chuck and the above described method used for turning down all the arcuate and helical surfaces thereof.

It will be noted that the leading points of the cutting teeth as viewed in Fig. 1 are quite blunt on account of the arcuate shape of the surfaces 15 and 16. This feature gives ruggedness and strength to the teeth and prevents the cutting edges 17 and 18 from overheating due to the amount of metal with which they are backed up. This bluntness of the teeth is practical with cutters which make a radial cut in the work only because the surface 15 is backed off from the work and hence does not create friction by rubbing thereagainst.

While a wood scarf joint cutter has been chosen for illustrating the principles of this invention it is to be understood that the same principles may be employed in designing rotary form cutters for cutting metal such as those used in milling machines.

The term "constant form" as used in the claims is intended to describe a cutter which may reground by grinding back the cutting surfaces without changing the form of the cut made thereby.

While the form of embodiment of the present invention as herein disclosed, constitutes a preferred form, it is to be understood that other forms might be adopted, all coming within the scope of the claims which follow.

What is claimed is as follows:

1. In a machine for cutting scarf joints, a rotary cutter comprising: a cutter head, a plurality of cutter blades fixed upon said head, said blades having a plurality of radial cutting edges making radial cuts in the work and a plurality of angular cutting edges making cuts at a substantial angle to the radial cuts, the faces in which both radial and angular cutting edges lie being backed off from the work cut thereby in both radial and axial directions, and means permitting said blades to be set forward upon said head whereby said blades may be ground back for resharpening purposes and again set so that their cutting edges are in their original position.

2. In a machine for cutting scarf joints, a rotary cutter comprising: a cutter head, a cutter blade fixed upon said head, said blade having a radial cutting edge making a radial cut in the work and an angular cutting edge making a cut at a substantial angle to the radial cut, the faces in which said radial and angular cutting edges lie being backed off from the work cut thereby in both radial and axial directions, and means permitting said blade to be set forward upon said head whereby said blade may be ground back for resharpening purposes and again set so that its cutting edges are in their original position relative to the axis of rotation.

3. A rotary form cutter having a head, a blade adjustably fixed upon said head, said blade having one cutting edge making a substantially radial cut, a second cutting edge making a cut slanting to the radial direction, the faces in which said cutting edges lie receding together in radial direction whereby the slanting cutting face is backed off from the slanting cut, and receding together in an axial direction whereby said other cutting face is backed off from the radial cut, and means permitting said blade to be set forward upon said head whereby said blade may be ground back for resharpening purposes and again set so that its cutting edges are in their original position relative to the axis of rotation.

In testimony whereof I hereto affix my signature.

JOHN W. LEE.